UNITED STATES PATENT OFFICE.

THOMAS SIM, OF CHARLESTON, SOUTH CAROLINA.

IMPROVED COMPOUND FOR PRESERVING FISH, MEAT, &c.

Specification forming part of Letters Patent No. 86,040, dated January 19, 1869.

*To all whom it may concern:*

Be it known that I, THOMAS SIM, of the city of Charleston and State of South Carolina, doctor of medicine, have invented a new and useful Composition for Preserving Fish and other Animal Matters; and I do hereby declare the following to be a full, clear, and exact description of it, and of the method of compounding the same, given so that others may be enabled to make and use it.

In five gallons of water I dissolve two pounds of sulphite of soda or bisulphite of soda and two ounces of carbolic acid, (in crystals.) I then take the fish, open and clean it thoroughly, taking out the back-bone. I then dip the fish in the solution for a short time, say for one to three minutes, and then hang it up to dry. If it is desired to cure the fish without opening it, it should remain a longer time in the solution.

In preserving oysters, clams, &c., instead of dissolving the above-named chemicals in water, they are to be dissolved in the oyster or clam liquor in similar proportions. I find that this process effectually cures and preserves the fish, &c., keeping it fresh for an indefinite length of time.

Each of the above-named chemicals acts advantageously on the matter to be preserved, and they so far neutralize each other as to prevent any unpleasant flavor or odor or deleterious effect.

Having thus described my invention, what I claim as new, and for which I desire to secure Letters Patent, is—

The compound herein described for preserving fish and other perishable articles.

THOS. SIM.

Witnesses:
H. C. BROOKS,
PRINCE S. CROWELL.